United States Patent [19]
Farrant et al.

[11] 3,892,511
[45] July 1, 1975

[54] EXTRUSION ORIFICE PLATE FOR EXTRUDING POTATO MIX

[75] Inventors: David A. Farrant, Northridge; Francis A. Dedona, Sherman Oaks, both of Calif.

[73] Assignee: The Scionics Corporation, Culver City, Calif.

[22] Filed: Sept. 26, 1973

[21] Appl. No.: 400,851

Related U.S. Application Data

[63] Continuation of Ser. No. 147,816, May 28, 1971, abandoned.

[52] U.S. Cl. ................................ 425/464; 425/382
[51] Int. Cl. ............................................. A21c 11/16
[58] Field of Search ..... 425/464, 382; 241/84, 84.4, 241/83, 95, 274; 83/9

[56] References Cited
UNITED STATES PATENTS

2,455,267  11/1948  Pacotto ............................ 241/84.4
3,057,523  10/1962  Rietz ................................... 222/387
3,468,354  9/1969   Reachert ........................... 222/80 X

*Primary Examiner*—Gil Weidenfeld
*Attorney, Agent, or Firm*—Lyon & Lyon

[57] ABSTRACT

A plate-like element for extruding potato dough in the process of making french fries or shoestring potatoes fabricated from a stainless steel sheet of approximately 0.109 inch thickness, the sheet being apertured to form the extrusion openings therein by conventional punching operations, and the plate-like element is used during the extrusion process such that the direction of extrusion is in a direction opposite to that in which the material was initially punched therefrom. The plate-like element may be formed with a small surrounding cylindrical portion terminating in a lip portion for insertion into an extrusion machine or alternatively such plate-like element may be formed as an integral part of a cylinder into which an extrusion piston extends.

2 Claims, 5 Drawing Figures

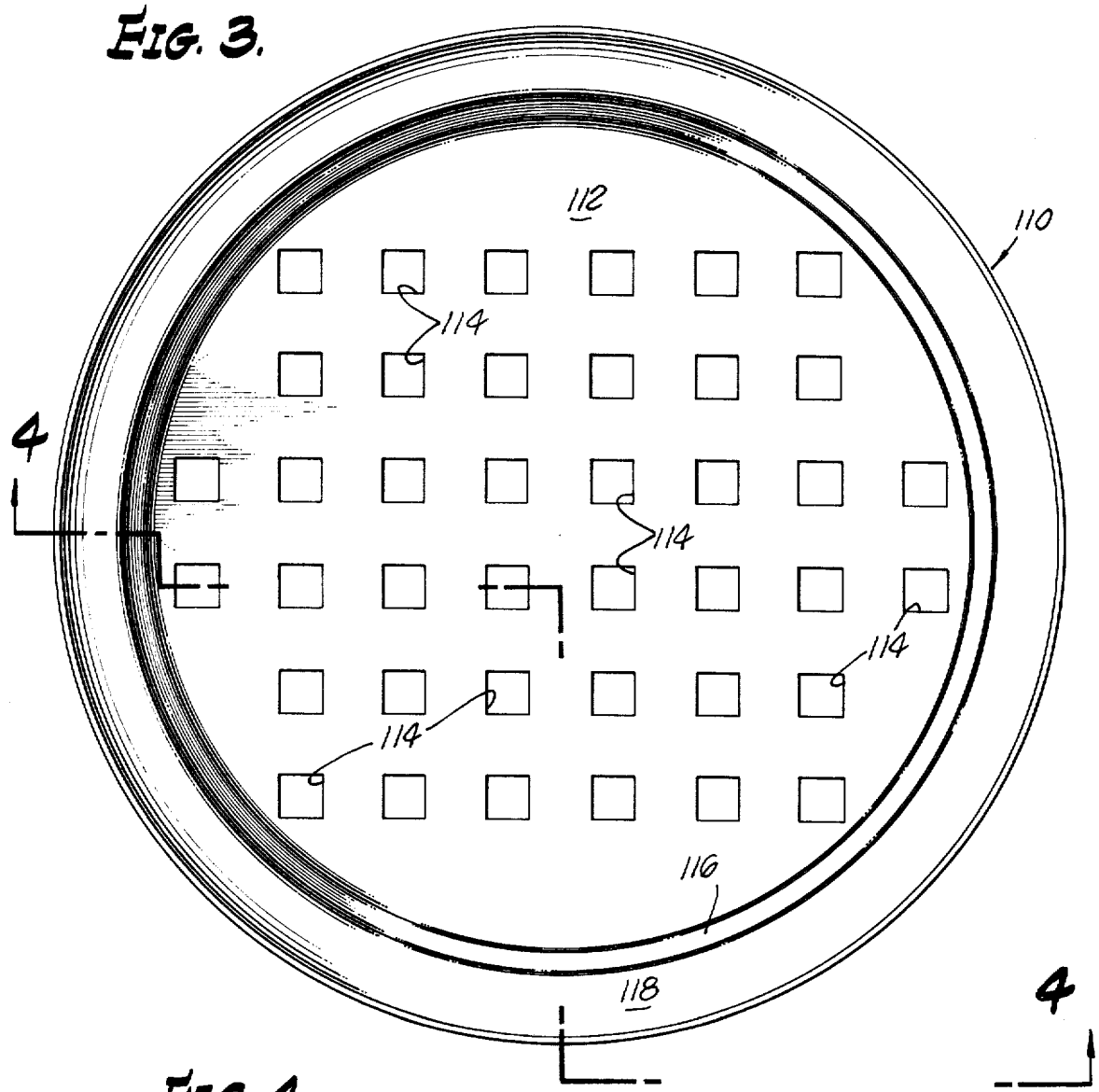
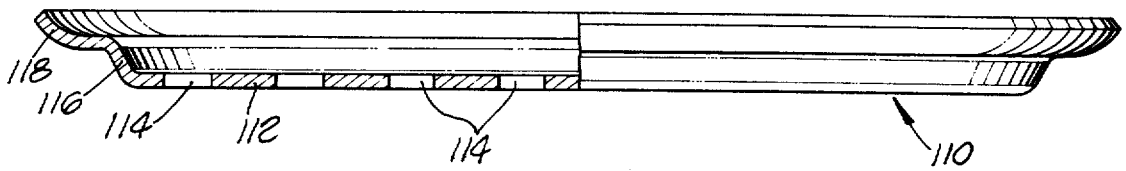

EXTRUSION ORIFICE PLATE FOR EXTRUDING POTATO MIX

This is a continuation of our application Ser. No. 147,816, filed May 28, 1971, now abandoned.

The present invention relates to improved means and techniques useful in food processing and particularly in the production of french fries and shoestring type potatoes from potato meal or dough.

A specific object of the present invention is to provide an improved extrusion plate through which a dough is extruded or dispensed readily for conventional deep-fat frying.

Another specific object of the present invention is to provide extrusion apparatus of this character which is relatively simple, easy to clean and maintain, reliable in operation and capable of producing extruded dough in small cross sections ready for frying in conventional deep-fat frying equipment.

A specific object of the present invention is to provide an improved extrusion plate which is particularly useful in extruding apparatus of the character described in the co-pending application of David A. Farrant and Robert Sirken, Ser. No. 820,091 filed Apr. 29, 1969.

Another specific object of the present invention is to provide an improved extrusion plate for extruding dough because of the fact that relatively small pressures are required for extrusions, thereby eliminating or obviating existing problems in the design, operation and maintenance of the mechanism used in moving the associated extrusion piston.

Another specific object of the present invention is to provide improved means and techniques whereby a metal extrusion plate of, for example, stainless steel, may be fabricated in a simple and expeditious manner, and when in use requires small unit pressure to achieve satisfactory extrusion operations.

Another specific object of the present invention is to provide means and techniques whereby an extrusion plate may be produced which is more durable, sanitary, less likely to crack, resistant to oil, of low cost, easy to clean, such that the dough is less inclined to stick thereto, allows extrusions of small cross-sections of such nature to form potato dough extrusions for shoestring type potatoes; a flat surface without any reentrant surface so as to allow cleaning with a simple brush and obviates the necessity of means required to be projected into re-entrant surfaces and which simplifies, obviates or eliminates problems in the design of suitable power operated means for moving the associated extrusion piston.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 3 is a top plan view of a modified form of the invention useful in extruding potato meal for shoestring type french fries.

FIG. 4 is a sectional view taken substantially on line 4—4 of FIG. 3.

Figure 1:
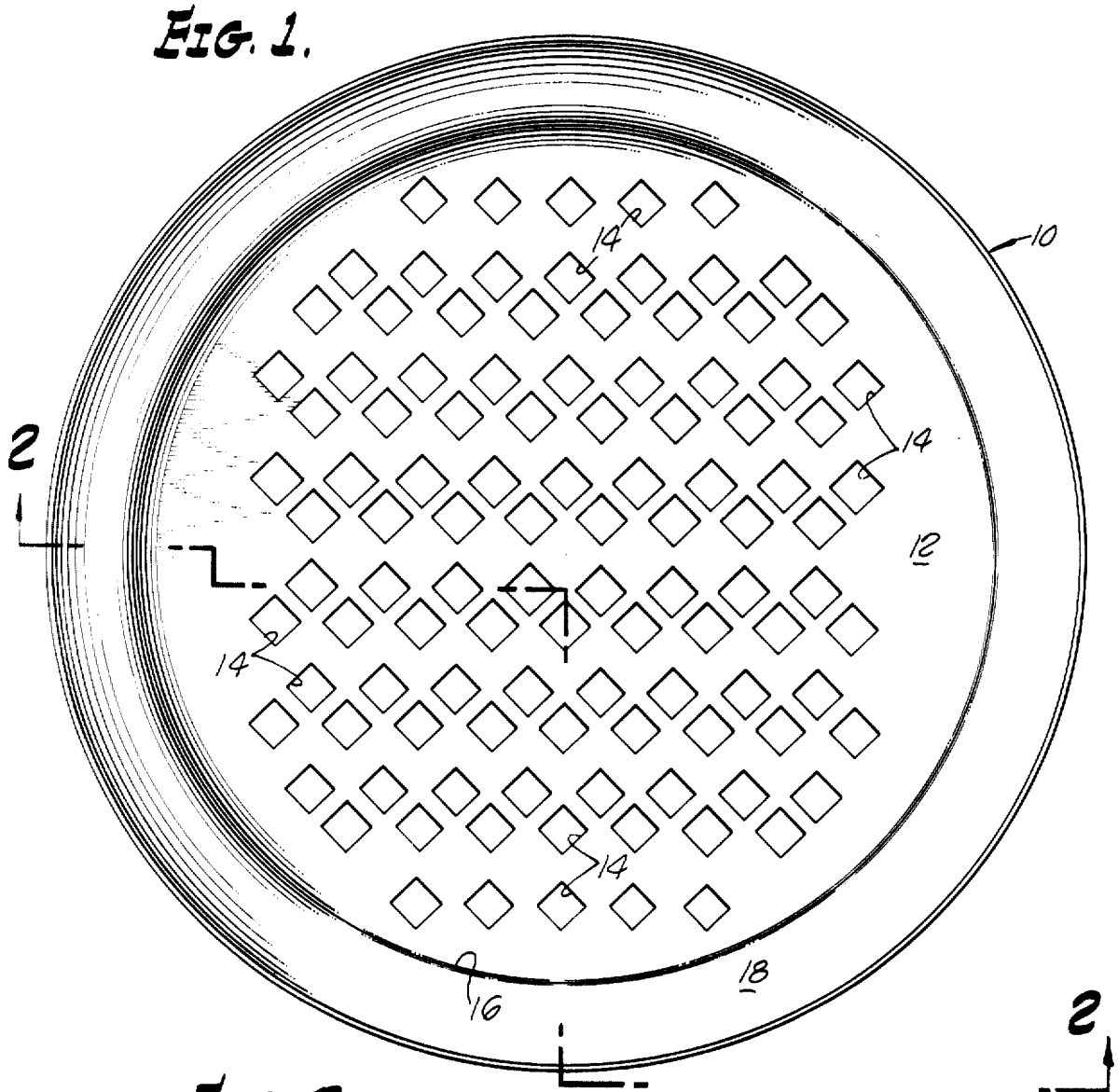
FIG. 1 is a top plan view of one of the extrusion plates for french fries of regular proportions embodying features of the present invention.

The extrusion plates 10, 110 of FIGS. 1 and 3 respectively are essentially of the same construction and differ in the size and location of the extrusion openings, the plate of FIG. 1 having smaller and more openings than the plate of FIG. 3. Corresponding parts in the two plates have ascribed thereto the same reference number with, however, the reference numbers of the plate of FIG. 3 being raised by 100.

The plate 10 is of metal, preferably stainless steel, and is in the general shape of a shallow circular saucer having a flat circular base portion 12 with rectangular apertured portions 14 extending therethrough, such base portion 12 being integrally formed within a circular wall portion 16 and the upper end of such circular wall portion being integrally formed with a circular concave lip portion 18.

Preferably the thickness of the base plate 12, i.e., the length of the apertured portions, is equal to or somewhat greater than one hundred and nine thousands of an inch (0.109 inch) because at less thickness there is a tendency for the dough extruded through such shorter openings to break up into small pieces instead of remaining in one piece with a length corresponding to the length of a french fry of regular proportions or shoestring potato. Longer apertured portions, i.e., greater thicknesses of the plate from which such apertured portions are punched by a punching operation results in greater required extrusion forces on the potato meal. It is, of course, desirable that the dough extrusion forces be a minimum. For these purposes, it is important that the internal surface area be a minimum consistent with production of a one-piece extrusion.

Another factor influencing the amount of required extrusion pressure is the difference between the area of the extruding piston (not shown) which has a diameter substantially equal to the outer diameter of the lip portion 18 and the total cross-sectional area of the extrusion orifices or apertured portions since in general the greater the difference between these two areas, the greater the extrusion pressure.

The more internal surface area there is to an orifice, the more the drag and the higher the extruding pressures will be.

Both of these major factors contribute to the extruding pressure in an opposite sense. When, in any given combination of extruder die and piston, an attempt is made to reduce extrusion pressure by increasing the number of extrusion orifices, only a small reduction in pressure may occur. This is because, as the number of extrusion orifices are increased (which should lower the pressure), the total area of the internal surfaces is also increased which introduces more drag.

The lowest extruding pressure will occur (for a given number and size of orifice) when the internal surface area of the orifices are held to a minimum. This requirement can be satisfied by employing:

a. the thinnest extruding die plate that is practicable; and b. selecting an orifice cross-sectional shape that provides the minimum periphery for a given cross-sectional area.

In this context, a straight-sided square hole is preferable to a "square" hole with concave sides.

With one exception, it has been observed that orifice entry funnel shape had little or no effect on reducing extrusion pressures. The one exception is when extruding orifices are sufficiently far apart to permit a wide angle funnel to be used. In this case, it is not the funnel shape that reduces the pressure, but the fact that the internal surfaces of the forming part of the orifice are reduced. This can be demonstrated on a "thick" plate by substituting the funnel for a reduction in plate thickness localized around each orifice. A counterbore in place of the funnel can be used to show this effect.

Flat areas of the extruding die plate, such as areas between orifices or entry funnels, were investigated for effects upon extruding pressures. Basically, the substitution of flat area for entry funnel area was examined.

Surface finish of extrusion plates was studied and found to be a minor factor in extrusion pressure reduction. Surface finishes examined ranged between an estimated 32 micro-inch to 8 or better. Smoother finishes, in contrast to the rougher finishes, reduced pressures up to 5 percent.

From the foregoing, it is preferable that a thin, flat plate with simple orifice shapes be used and that the orifices should be as large and as numerous as possible.

It will be appreciated that the plates as illustrated may in some instances be formed as an integral part of a large cylindrical container for the potato meal within which a power operated piston moves to cause the potato meal to be extruded through the apertured portions.

Preferably such apertured portions are produced from blank stock using a punching operation in which a punch punches out the plate apertured portions.

The manner in which such punching operation is carried out is of importance because it has an affect on the subsequently required extrusion pressure.

Figure 2:
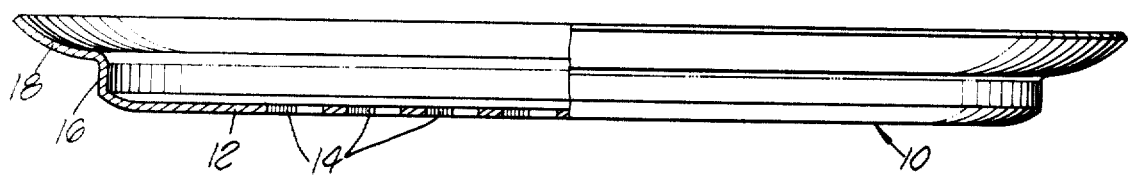
FIG. 2 is a sectional view taken on line 2—2 of FIG. 1.
Figure 2A:
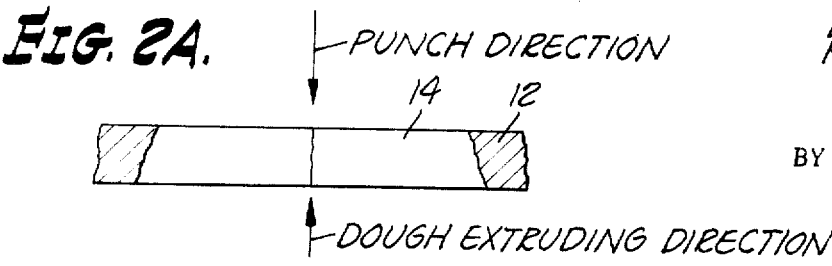
FIG. 2A shows one of the apertured portions.

For these purposes, the punch during the punching operation moves with respect to the plate being punched in a direction opposite to that direction in which the potato dough is subsequently extruded. This is indicated in FIG. 2A wherein also the shape of walls of the apertured portion is illustrated. It is seen in FIG. 2A that one of the apertured portions shown in somewhat exaggerated form has non-straight walls. The opening at the top of the plate is greater than the opening at the bottom of the plate, and the walls are somewhat irregular due to the nature of the punching operation which is believed to involve a combination of shearing and tearing of metal in the formation of such apertured portions.

We claim

1. In apparatus for producing french fries from a potato dough in which the potato dough is extruded under pressure through apertured portions of an extrusion type die means wherein the improvement comprises, (In an arrangement for extruding potato dough for use in the process of making french fries, shoestring potatoes and the like,) said die means being a plate of uniform thickness having a series of extrusion apertured portions punched therethrough by conventional punching means, the thickness of the plate and correspondigly the length of each of said apertured portions being no greater than approximately one-eighth of an inch and not less than approximately 0.109 of an inch, each of said apertured portions (each having a lenght equal to the thickness of said plate and each apertured portion) being of substantially uniform cross-sectional area and shape throughout its length, and said plate being positioned in said apparatus so that the surface thereof through which the material punched therefrom exited during a punching operation is the surface for entrance of said dough to be extruded through said apertured portions.

2. In apparatus (An arrangement) as set forth in claim 1 in which said extrusion plate is of stainless steel.

* * * * *